United States Patent
Maeda et al.

(10) Patent No.: US 9,166,460 B2
(45) Date of Patent: Oct. 20, 2015

(54) ROTARY ELECTRIC MACHINE

(75) Inventors: Naohide Maeda, Chiyoda-ku (JP);
Masahiko Fujita, Chiyoda-ku (JP);
Masaki Kato, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 302 days.

(21) Appl. No.: 13/612,107

(22) Filed: Sep. 12, 2012

(65) Prior Publication Data

US 2013/0334934 A1  Dec. 19, 2013

(30) Foreign Application Priority Data

Jun. 14, 2012 (JP) ................. 2012-134854

(51) Int. Cl.
*H02K 11/00* (2006.01)
(52) U.S. Cl.
CPC ........ *H02K 11/0073* (2013.01); *H02K 11/0015* (2013.01)
(58) Field of Classification Search
CPC ........... H02K 11/0015; H02K 11/0073
USPC ................................. 310/64, 68 B
See application file for complete search history.

(56) References Cited

U.S. PATENT DOCUMENTS

| 8,299,666 B2* | 10/2012 | Shirakata et al. | 310/68 R |
|---|---|---|---|
| 2002/0043885 A1* | 4/2002 | Asao et al. | 310/90 |
| 2004/0012292 A1* | 1/2004 | Kometani et al. | 310/184 |
| 2006/0202573 A1* | 9/2006 | Uehara et al. | 310/64 |
| 2007/0257568 A1* | 11/2007 | Akita et al. | 310/64 |
| 2009/0243407 A1* | 10/2009 | Kato et al. | 310/62 |
| 2009/0302706 A1* | 12/2009 | Shirakata et al. | 310/239 |
| 2010/0097053 A1* | 4/2010 | Kikuchi et al. | 324/207.25 |
| 2010/0102683 A1* | 4/2010 | Utsumi et al. | 310/68 D |
| 2010/0117468 A1* | 5/2010 | Kurita | 310/71 |
| 2010/0133961 A1* | 6/2010 | Shirakata et al. | 310/68 B |
| 2010/0231080 A1* | 9/2010 | Fujita et al. | 310/181 |
| 2012/0181903 A1* | 7/2012 | Kato et al. | 310/67 R |

FOREIGN PATENT DOCUMENTS

| JP | 2004-129362 A | 4/2004 |
|---|---|---|
| JP | 2008-72776 A | 3/2008 |

* cited by examiner

*Primary Examiner* — Alex W Mok
(74) *Attorney, Agent, or Firm* — Sughrue Mion, PLLC; Richard C. Turner

(57) ABSTRACT

Provided is a rotary electric machine including housings, a stator, a rotor, bearings, a slip ring, a power assembly, a control assembly, a rotation sensor, and a brush holder, in which a switching element mounting surface of the power assembly and a surface of the control assembly, on which a control element of a control circuit is mounted, are placed in parallel to a rotation shaft, and the rotation sensor is placed between the rear bearing and the slip ring.

8 Claims, 5 Drawing Sheets

ROTARY ELECTRIC MACHINE

BACKGROUND OF THE INVENTION

1. Field of the Invention

The present invention relates to a rotary electric machine.

2. Description of the Related Art

Conventionally, there has been known an AC rotary electric machine in which a power assembly including a switching element for carrying a current to a stator having an armature winding, a control assembly including a control circuit for controlling the power assembly, and a rotation sensor for detecting a rotation state of a rotor are mounted.

For example, Japanese Patent Application Laid-open No. 2008-72776 discloses a rotary electric machine including a power block having a switching circuit, a control board including a control circuit for controlling the switching circuit, a case for housing the control board, and a rotation sensor provided further on the rear side with respect to a slip ring. In order to increase rigidity of the case for housing the control board, a fixing member is provided at the case so as to fasten the control board and a rear bracket respectively to the fixing member. Thus, the rigidity of the case is increased with the fixing member to enhance the vibration resistance of a control circuit part.

Further, Japanese Patent Application Laid-open No. 2004-129362 proposes a motor for electric power steering in which a power element and a control circuit are placed in a case to constitute a control circuit part, the control circuit part is fixed to the outer circumference of a motor body, a rotation sensor of a rotor is fixed inside a housing, and correcting means for electrically correcting the fixing position of the rotation sensor is provided. By fixing the rotation sensor inside the housing, damages caused during transportation are prevented, and the position adjustment of the rotation sensor, which becomes difficult due to the placement of the rotation sensor inside the housing, is electrically performed.

The rotary electric machine has the problems of how to enhance the accuracy of the rotation sensor and how to efficiently cool an electric component. Regarding these problems, in the configuration disclosed in Japanese Patent Application Laid-open No. 2008-72776 described above, the rotation sensor is provided further on the rear side with respect to the power block and the slip ring, and hence, this configuration does not address the problem of how to enhance the accuracy of the rotation sensor. Further, although the configuration disclosed in Japanese Patent Application Laid-open No. 2008-72776 enhances the vibration resistance of the control circuit part as described above, this configuration does not address the problem of how to efficiently cool the power block.

In the configuration disclosed in Japanese Patent Application Laid-open No. 2004-129362 described above, the control circuit and the power element are placed on the outer circumference of the motor as one control circuit part. However, such a configuration is made on a premise that the motor for electric power steering is used. The motor for electric power steering is a product which assists a driver to torque a steering wheel when the driver turns the steering wheel, and the rotor of the motor rotates only at a low speed or is not operated unless the driver turns the steering wheel. Therefore, it is impossible to generate cooling air by fixing a fan to the rotor. Specifically, the configuration disclosed in Japanese Patent Application Laid-open No. 2004-129362 has a structure for use in such a product. Therefore, when the structure of Japanese Patent Application Laid-open No. 2004-129362 is applied to equipment to be constantly used, such as a vehicle power generator, there is a concern about insufficient cooling performance. Further, the structure of Japanese Patent Application Laid-open No. 2004-129362 is not made on a premise that the cooling air is generated by fixing a fan to the rotor, and hence, does not address the problem of how to efficiently cool the power element with a fan.

SUMMARY OF THE INVENTION

The present invention has been made so as to solve the above-mentioned problems, and it is an object of the present invention to provide a rotary electric machine having an internal layout capable of enhancing the accuracy of a rotation sensor and enhancing a cooling property of an electric component.

In order to achieve the above-mentioned object, according to an exemplary embodiment of the present invention, there is provided a rotary electric machine, including: a front housing and a rear housing; a stator including an armature winding and integrally fixed to the front housing and the rear housing; a rotor including a shaft to be a rotation shaft and a field winding and placed so as to be opposed to the stator; a front bearing and a rear bearing integrally fixed to the front housing and the rear housing, for rotatably holding the rotor; a slip ring integrally fixed to the shaft, for supplying a field current to the field winding; a power assembly including a heat sink and a switching element for carrying a current to the stator; a control assembly including a control circuit for controlling the switching element; a rotation sensor including a sensor rotor integrally fixed to the shaft and a rotation detecting part integrally fixed to the rear housing; and a brush holder holding a brush for supplying a current to the slip ring, in which: a surface of the power assembly, on which the switching element is mounted, and a surface of the control assembly, on which a control element of the control circuit is mounted, are placed in parallel to the rotation shaft; and the rotation sensor is placed between the rear bearing and the slip ring.

According to the present invention, the rotary electric machine can have an internal layout capable of enhancing the accuracy of a rotation sensor and enhancing a cooling property of an electric component.

DETAILED DESCRIPTION OF THE PREFERRED EMBODIMENTS

Figure 1:
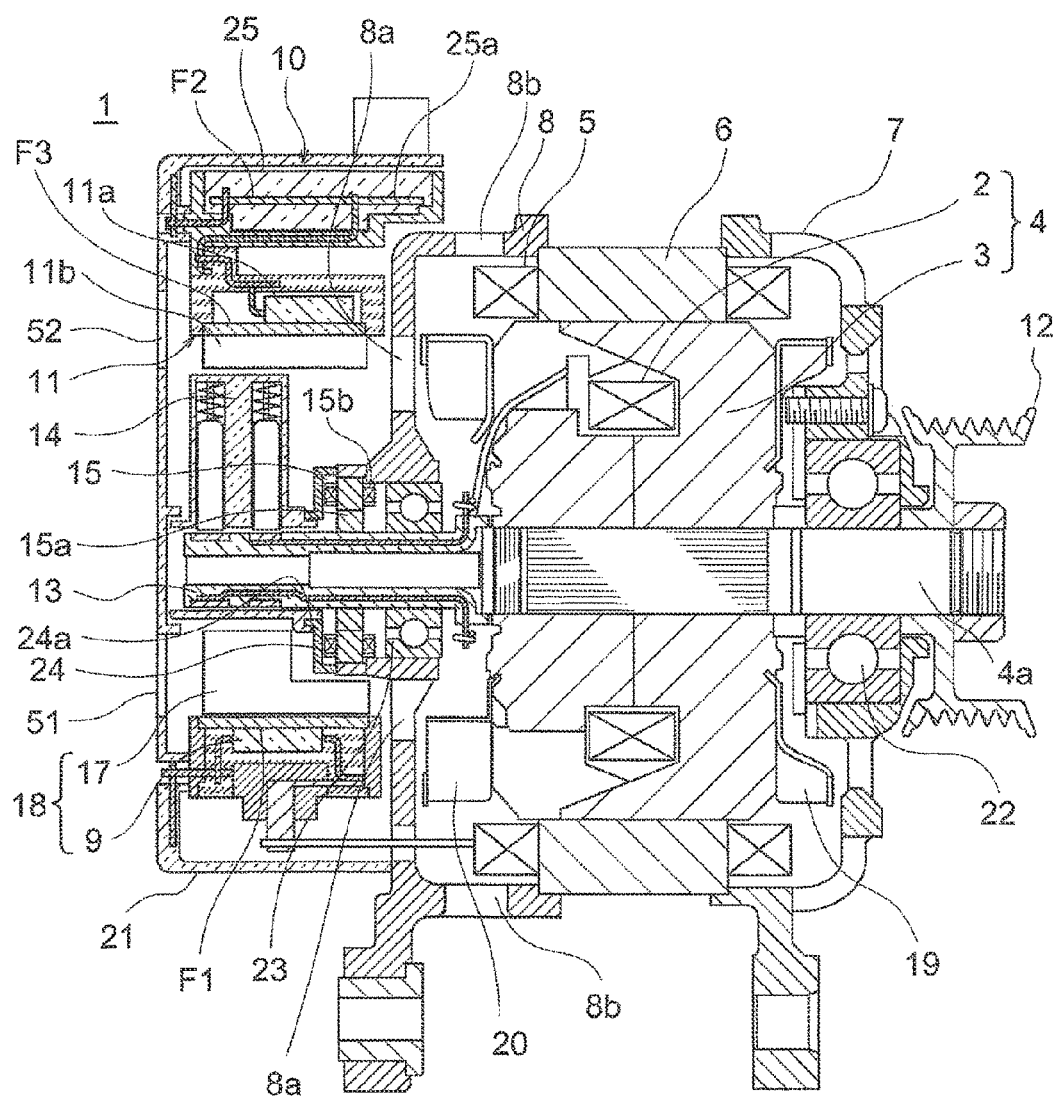
FIG. 1 is a cross-sectional view illustrating a structure of a rotary electric machine according to a first embodiment of the present invention.

Hereinafter, a rotary electric machine according to the present invention is described by way of embodiments with reference to the drawings. In the drawings, like reference symbols denote like or corresponding parts. Further, in the following embodiments, description is made on a rotary electric machine as an example, which is used as an electric motor to re-start a connected engine and which is used as a power generator to supply power to vehicle equipment and charge a battery.

First Embodiment

Figure 2:
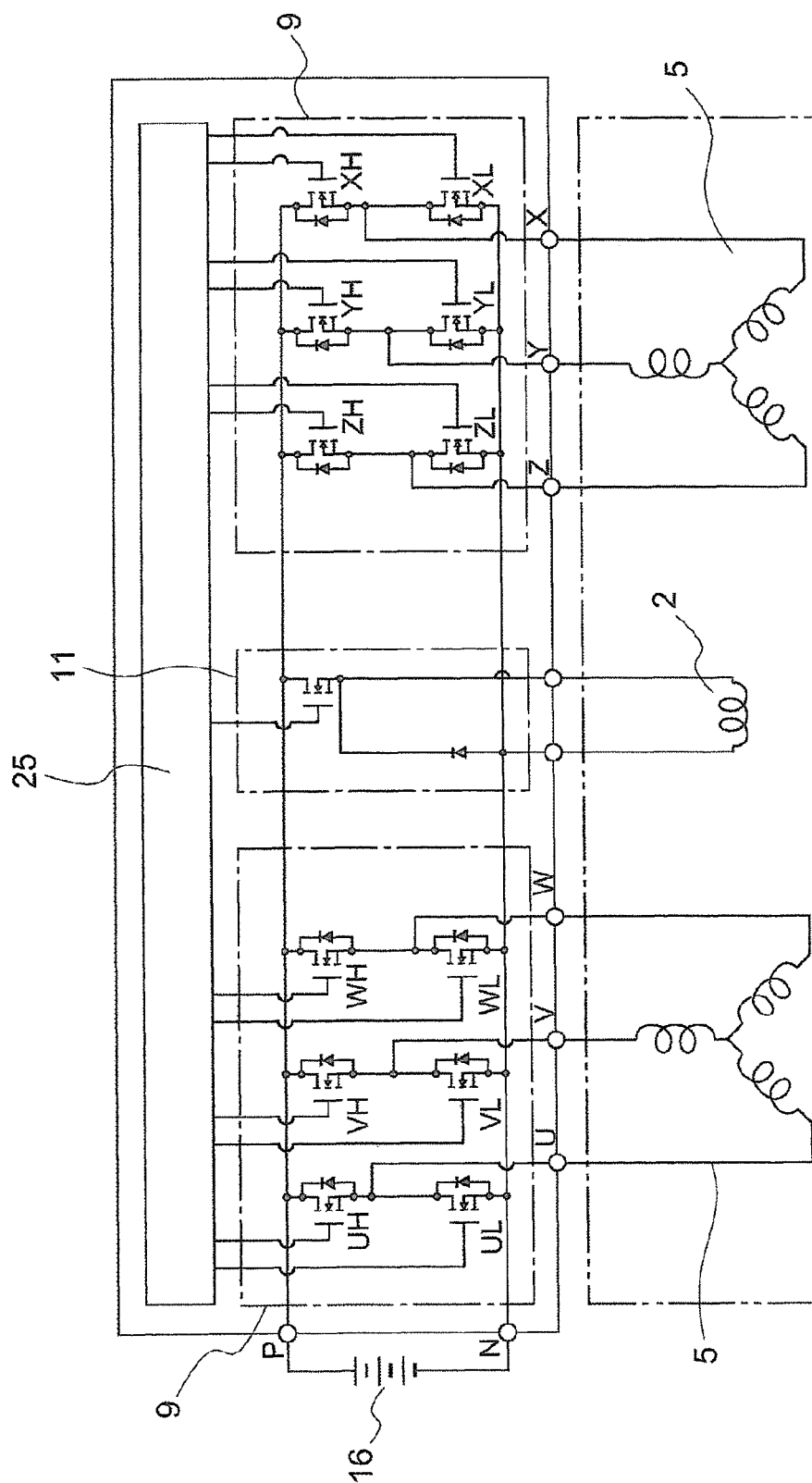
FIG. 2 is an electric circuit diagram of the rotary electric machine according to the first embodiment of the present invention.
Figure 3:
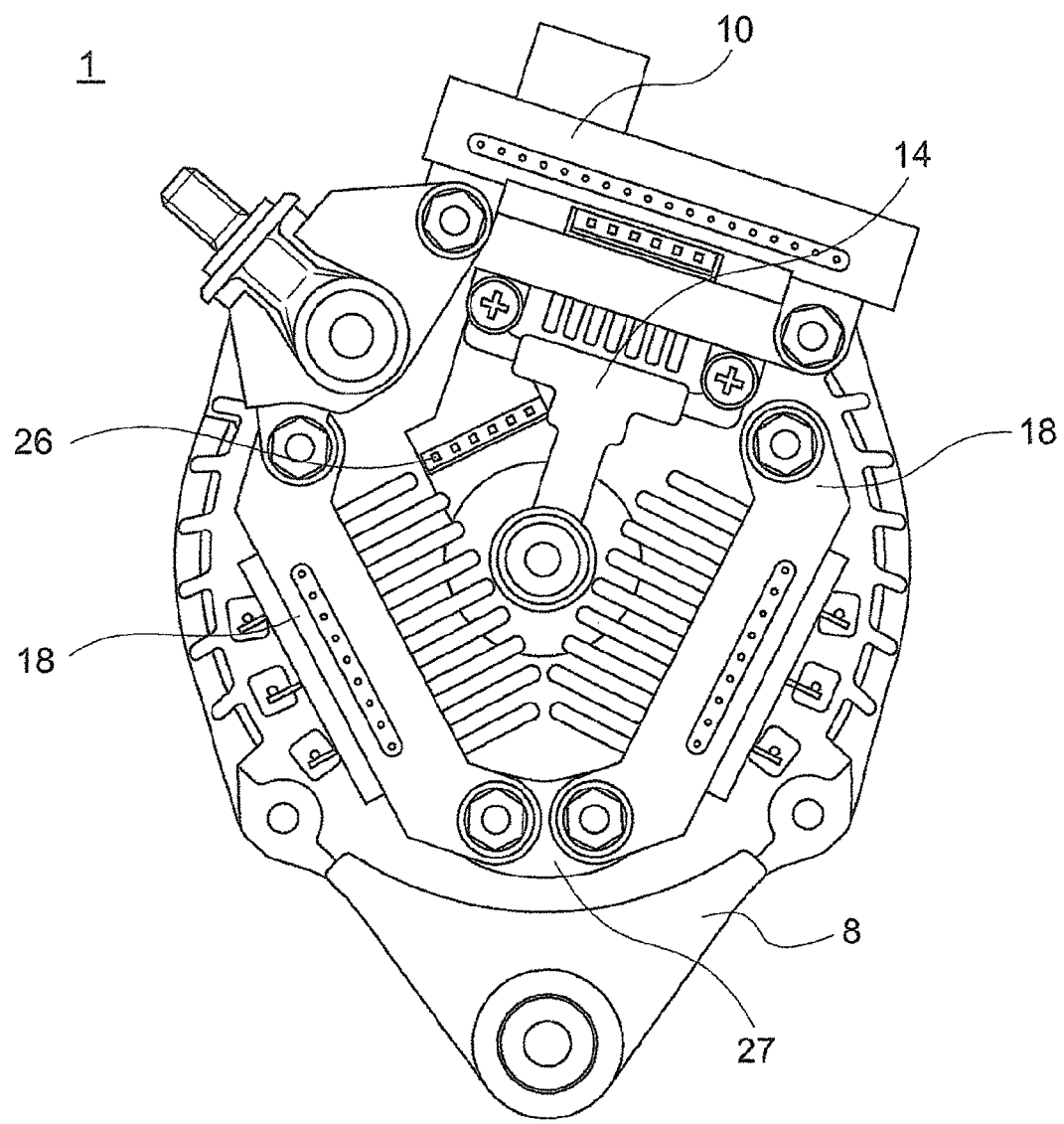
FIG. 3 is a view illustrating an outer side of a rear housing of the rotary electric machine according to the first embodiment of the present invention.

FIG. 1 is a cross-sectional view illustrating a structure of a rotary electric machine according to a first embodiment of the present invention. FIG. 2 is an electric circuit diagram of the rotary electric machine. FIG. 3 is a view illustrating an outer side of a rear housing of the rotary electric machine with a cover removed.

In FIG. 1, a rotary electric machine 1 includes two kinds of housings (front housing 7 and rear housing 8), a rotor 4, and a stator 6. The rotor 4 includes a field winding 2, a field core 3 for holding the field winding 2 so as to cover the field winding 2, and a shaft 4a to be a rotation shaft. The rotor 4 is held rotatably by the front housing 7 and the rear housing 8 through the intermediation of a front bearing 22 and a rear bearing 23 as a pair of front and rear bearings.

The stator 6 includes an armature winding 5 and is fixed to the front housing 7 and the rear housing 8 so as to be positioned on the outer circumferential side of the rotor 4. A pulley 12 for giving or receiving torque bidirectionally with respect to an internal combustion engine (not shown) is fixed to one side end of the rotor 4 and is connected to the internal combustion engine through the intermediation of a belt. In the description of the specification and claims, a pulley side is defined as a front side and an anti-pulley side is defined as a rear side.

The rotor 4 has a slip ring 13 for supplying a field current and receives the field current from a brush holder 14 via a brush. The field current is adjusted by a field circuit (described later) so that generated torque or generated electricity required as a current value can be output.

A control assembly 10 and a power assembly 18 are mounted on the rotary electric machine 1. The control assembly 10 includes a control circuit module 25 and a field module 11.

A field circuit 11a is integrated with a heat sink 11b for cooling and a case having various lines so as to be packaged to be one unit as a field module 11 and mounted on the rotary electric machine 1. Further, fans 19 and 20 for generating cooling air are fixed to the respective end surfaces of the field core 3 of the rotor 4.

The control circuit module 25 controls the field circuit 11a and switching elements, and includes a control board 25a on which various components are mounted and a case for protecting the control board 25a. The case of the control circuit module 25 includes terminals for connection to signal wiring and power wiring for connection to the field module 11 and the power module 9. The control circuit module 25 also includes a connector for connection to an external controller (not shown).

The power assembly 18 includes a power module 9 and a heat sink 17 for cooling the power module 9. The power module 9 has a configuration in which switching elements for supplying an armature current during driving and rectifying an armature current during power generation are integrated with a peripheral circuit. The power module 9 is protected by the case of the power assembly 18, and the case of the power assembly 18 contains signal wiring and power wiring 27 (see FIG. 3) for controlling the switching elements, terminals to be connected to the stator 6, and the like.

A cover 21 for covering the power assembly 18, the control assembly 10, and the like so as to protect them is fixed to the rear side of the rotary electric machine 1.

Next, the operation of the rotary electric machine 1 according to the first embodiment is described. In the case where the rotary electric machine 1 is operated as an electric motor, the rotary electric machine 1 gives an instruction so that a field current flows from the control circuit module 25 of the control assembly 10 to the field module 11 so as to excite the field winding 2. Then, by causing a three-phase AC waveform to flow to the power assembly 18, the rotor 4 is rotated to output torque.

On the other hand, in the case where the rotary electric machine 1 is operated as a power generator, the rotary electric machine 1 receives an instruction of a required power generation current from the external controller and gives an instruction to the field module 11 so that the control circuit module 25 causes a field current to flow in accordance with the required power generation current. Further, the control assembly 10 measures a phase voltage, and gives an instruction to the power assembly 18 to switch the switching elements in the case where the phase voltage exceeds an output voltage, whereby an AC current generated in the armature winding 5 is rectified to a DC current.

In the first embodiment, a switching circuit and a control circuit are configured as the power module 9 and the control circuit module 25 so that the switching circuit and the control circuit can be inspected for performance, respectively, and hence, defective products are prevented from being assembled to the rotary electric machine 1 at a time of the assembly of those circuits, which enhances the yield of the rotary electric machine 1.

Further, the power assembly 18 is mounted on the rear housing 8 so that a switching element mounting surface F1 thereof is parallel to the rotation shaft of the rotor 4. The heat sink 17 of the power assembly 18 has a fin to be cooled with intake air in an axial direction, and the cover 21 has an intake port 51 in a portion corresponding to the fin. The control assembly 10 is placed so that a mounting surface (surface on which a control element of the control circuit is mounted) F2 of the control board 25a is parallel to the rotation shaft of the rotor 4, and the field module 11 is also mounted so that a surface F3 thereof, on which the field circuit 11a is mounted, is parallel to the rotation shaft of the rotor 4. The heat sink 11b of the field module 11 also has a fin to be cooled with intake air in the axial direction, and the cover 21 has an intake port 52 in a portion corresponding to the fin. The control assembly 10 can be placed without closing the intake port 51 and a cooling path of the power assembly 18.

In the first embodiment, the cooling air is generated by the fans 19 and 20 fixed to the end surfaces of the field core 3 of the rotor 4. In order to cool the armature winding 5 which is to reach the highest temperature in the rotary electric machine 1, the fans 19 and 20 are designed so as to draw air in the axial direction through an intake window 8a and exhaust air in a radial direction through an exhaust window 8b in terms of the relationship between the inside and the outside of the rear housing 8. In the first embodiment, the power assembly 18 and the control assembly 10 are cooled by drawing air in the axial direction, and thereby, the cooling of the power assembly 18 and the control assembly 10 can be efficiently matched with the cooling of the armature winding 5 by drawing air in the axial direction. This can simplify a cooling air path of the entire rotary electric machine 1 and increase an intake amount without a large resistance, with the result that cooling efficiency can be enhanced. Further, the direction of drawing air is different from that of exhausting air, which prevents the high-temperature exhausted air from being often drawn again, and hence, each component can be cooled efficiently and reliably.

Further, in the first embodiment, the rotation sensor 15 is mounted immediately on the rear side with respect to the rear bearing 23. As an example of the rotation sensor 15, a resolver is described. The resolver includes a resolver rotor (sensor rotor) 15a to be fixed to the shaft 4a and a resolver stator (rotation detecting part) 15b fixed integrally to the rear housing 8. A resolver rotor placement part in the shaft 4a is formed by extending the shaft 4a further to the rear side from a rear bearing inserting part. With this configuration, first, there is an advantage in that the resolver rotor placement part can be processed coaxially (processed simultaneously) with the rear bearing inserting part. Further, second, there is an advantage in that, even in the case where the shaft 4a is press-fitted into the field core 3 during assembly, the coaxiality can be held between the resolver rotor placement part and the rear bearing inserting part. Owing to these two advantages, the deflection of the resolver with respect to the rotation shaft of the rotor 4 can be reduced, and the detection accuracy of the resolver can be enhanced. Similarly, by coaxially processing (simultaneously processing) the resolver stator inserting part of the rear housing 8 which supports the resolver stator 15b and the bearing inserting part of the rear housing 8, the decentering of the resolver stator 15b with respect to the rotation shaft can be reduced, which also can enhance the detection accuracy of the resolver.

Further, in the first embodiment, the rear side of the resolver stator 15b is covered with a resolver protecting cover (rotation sensor protecting cover) 24. The rotor 4 includes the slip ring 13 further on the rear side with respect to the resolver rotor placement part, and hence, the resolver protecting cover 24 has a through-hole 24a for allowing the shaft 4a to pass therethrough. The brush holder 14 is placed on the rear side with respect to the resolver protecting cover 24 so as to correspond to the position of the slip ring 13, and specifically, the brush holder 14 is connected to the rear side of the resolver protecting cover 24. In the first embodiment, the resolver protecting cover 24 is combined with the brush holder 14, and further, the brush holder 14 is covered with the cover 21 from outside, whereby the resolver and the slip ring 13 can be protected from foreign matters and water. In particular, the shaft 4a passes through the center of the rotation sensor 15, and hence, the resolver protecting cover 24 is combined with the brush holder 14 to ensure a higher waterproof property so that waterproofing does not become insufficient only with the resolver protecting cover 24.

As is apparent from FIG. 1, in the rotary electric machine 1 of the first embodiment, the rotation sensor 15 and a part of the control assembly 10 are aligned in a direction (radial direction) orthogonal to the rotation shaft of the rotor 4. This allows most part of a connection path between the control assembly 10 and the rotation sensor 15 to be placed in the radial direction (see, for example, a rotation sensor signal connecting part 26 of FIG. 3). Thus, the following advantage can be obtained: it is not necessary to extend connection wiring in the rotation shaft direction and the connection path can be shortened, which can reduce the influence of external noise to be superimposed on a sensor signal, with the result that a malfunction of the rotary electric machine 1 can be prevented. Note that, the connection form of the power module 9, the control circuit module 25, the field module 11, and the like is illustrated in FIG. 2, and reference numeral 16 in FIG. 2 denotes a battery.

Further, as illustrated in FIG. 3, in the rotary electric machine 1 of the first embodiment, two power assemblies 18 are provided and placed so that adjacent circumferential end surfaces thereof are close to each other. Further, the circumferential end surface of each power assembly 18 is placed so as to be close to the circumferential end surface of the control assembly 10. The power assemblies 18 and the control assembly 10 are placed closely to each other, whereby the power wiring 27 and signal wiring for connecting the assemblies can be shortened, and the loss in the power wiring 27 and the influence of external noise to be superimposed on the signal wiring can be reduced.

According to the first embodiment configured as described above, an internal layout capable of enhancing the accuracy of a rotation sensor and enhancing the cooling property of an electric component can be provided. Specifically, the deflection of the shaft with respect to the rotation shaft becomes smaller toward a bearing. Therefore, by placing the rotation sensor immediately on the rear side with respect to the rear bearing, the decentering and deflection of the sensor rotor of the rotation sensor with respect to the rotation shaft can be reduced to enhance the detection accuracy of the rotation sensor. Further, by mounting the power assembly and the control assembly respectively in parallel to the axial direction and providing the cooling fin of the power assembly in parallel to the axial direction, the resistance of the cooling air path can be reduced to enhance a cooling property.

Further, in the first embodiment, the following advantage is obtained. The power assembly and the control assembly are separated from each other, whereby each component can be checked for defects during production, and the yield of a product can be enhanced. By mounting the power assembly and the control assembly respectively in parallel to the axial direction, an outer diameter of the rotary electric machine can be reduced. Further, by placing the slip ring on the rear side with respect to the rear bearing, the diameter of the slip ring can be reduced, and hence, the sliding distance between the slip ring and the brush per rotation is shortened to prolong the lives of the brush and the slip ring. Further, the traveling distance of a vehicle is extended to prolong the life of the rotary electric machine eventually. Further, the rotation detecting part can be fixed at an accurate position with respect to the sensor rotor of the rotation sensor. The sensor rotor placement part and the rear bearing inserting part in the shaft can be processed coaxially, and the rotation detecting part inserting part and the bearing inserting part in the rear housing can also be processed coaxially. Therefore, the decentering of the rotation sensor with respect to the bearing can be reduced, which can also enhance the rotation detection accuracy.

Further, the control circuit module obtained by modularizing the control circuit and the field module obtained by modularizing the field circuit for supplying power to the field winding are mounted on the control assembly so that the control circuit and the field circuit can be configured as one assembly. Therefore, the mounting property of the circuits with respect to the rotary electric machine is enhanced.

Further, the rotation sensor and a part of the control assembly are aligned in a direction orthogonal to the rotation shaft. Therefore, the connection wiring between the rotation sensor and the control assembly can be shortened, and the influence of noise from outside to be carried through a wiring, such as switching noise generated during on/off of the switching elements, can be reduced.

Further, in the case where the circumferential end surfaces of the power assembly and the control assembly are close to each other, by placing a power source terminal or a signal terminal on the end surface of each assembly, the length of the power wiring and signal wiring for connecting the power assembly and the control assembly can be shortened and cost can be reduced. In particular, by shortening the signal wiring, the influence of noise from outside can be reduced, which can prevent a malfunction of the rotary electric machine and enhance reliability.

The rotation sensor is covered with the rotation sensor protecting cover from the rear side, and further, the brush holder is connected to the rear side of the rotation sensor protecting cover. Therefore, the rotation sensor and the slip ring can be protected from foreign matters and water.

Second Embodiment

Figure 4:
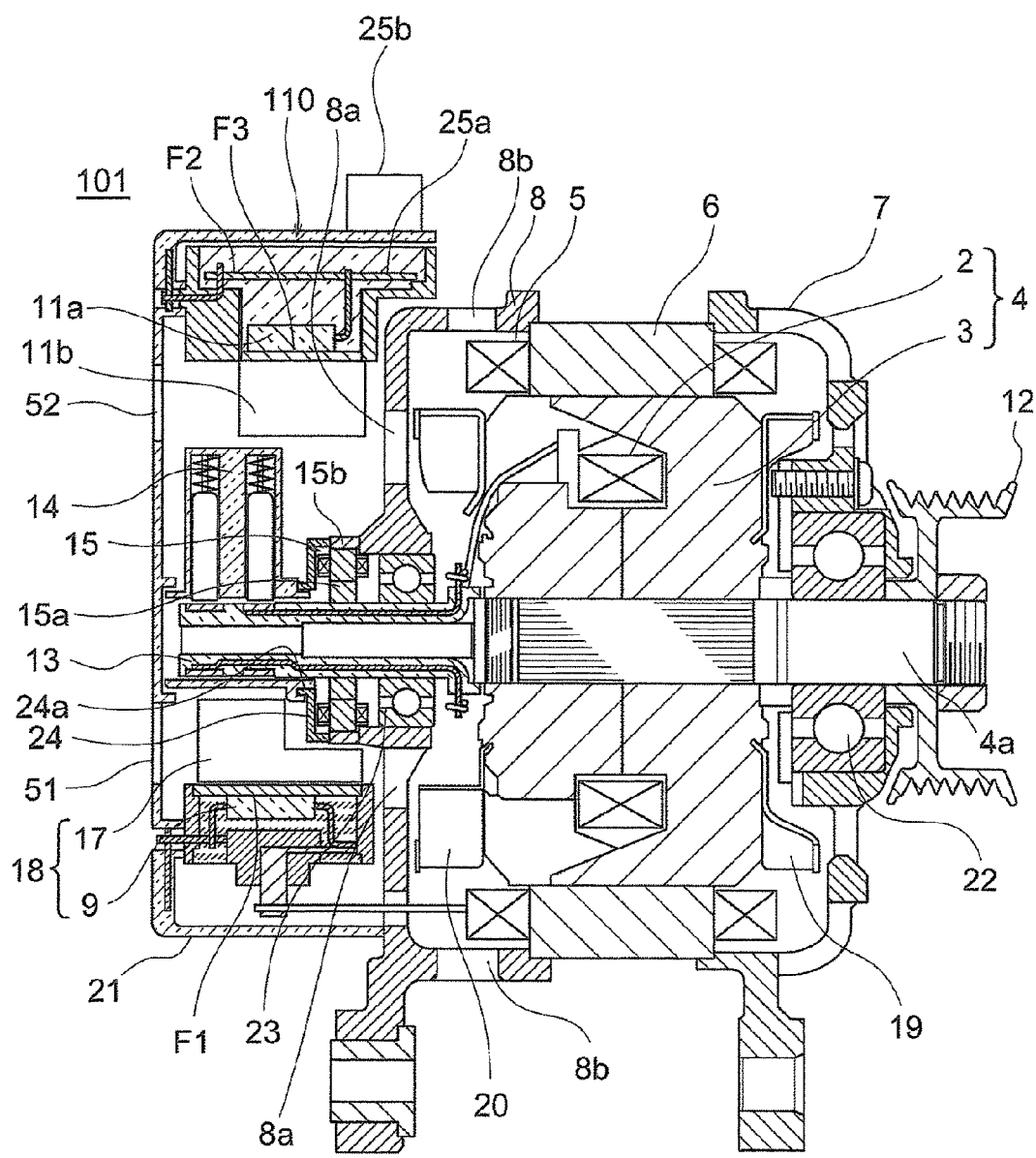
FIG. 4 is a cross-sectional view illustrating a structure of a rotary electric machine according to a second embodiment of the present invention.

Next, a second embodiment of the present invention is described with reference to FIG. 4. FIG. 4 is a cross-sectional view illustrating a structure of a rotary electric machine according to the second embodiment of the present invention. In a control assembly 110 in a rotary electric machine 101 of the second embodiment, a control board 25a and a field circuit 11a are housed in a common case to be packaged to be a unit as one module, a heat sink 11b is provided on the field circuit 11a side, and a heat sink 25b is provided on the control board 25a side. With this configuration, signal wiring between a control circuit and the field circuit can be inserted in the case, which simplifies the connection therebetween to enhance productivity. Further, a connecting part can be protected and the signal wiring can be shortened, whereby the influence of external noise can be reduced. Further, by integrating a module related to the control circuit with a module related to the field circuit, a component space can be reduced and the mounting property of components with respect to the rotary electric machine can be enhanced.

Third Embodiment

Figure 5:
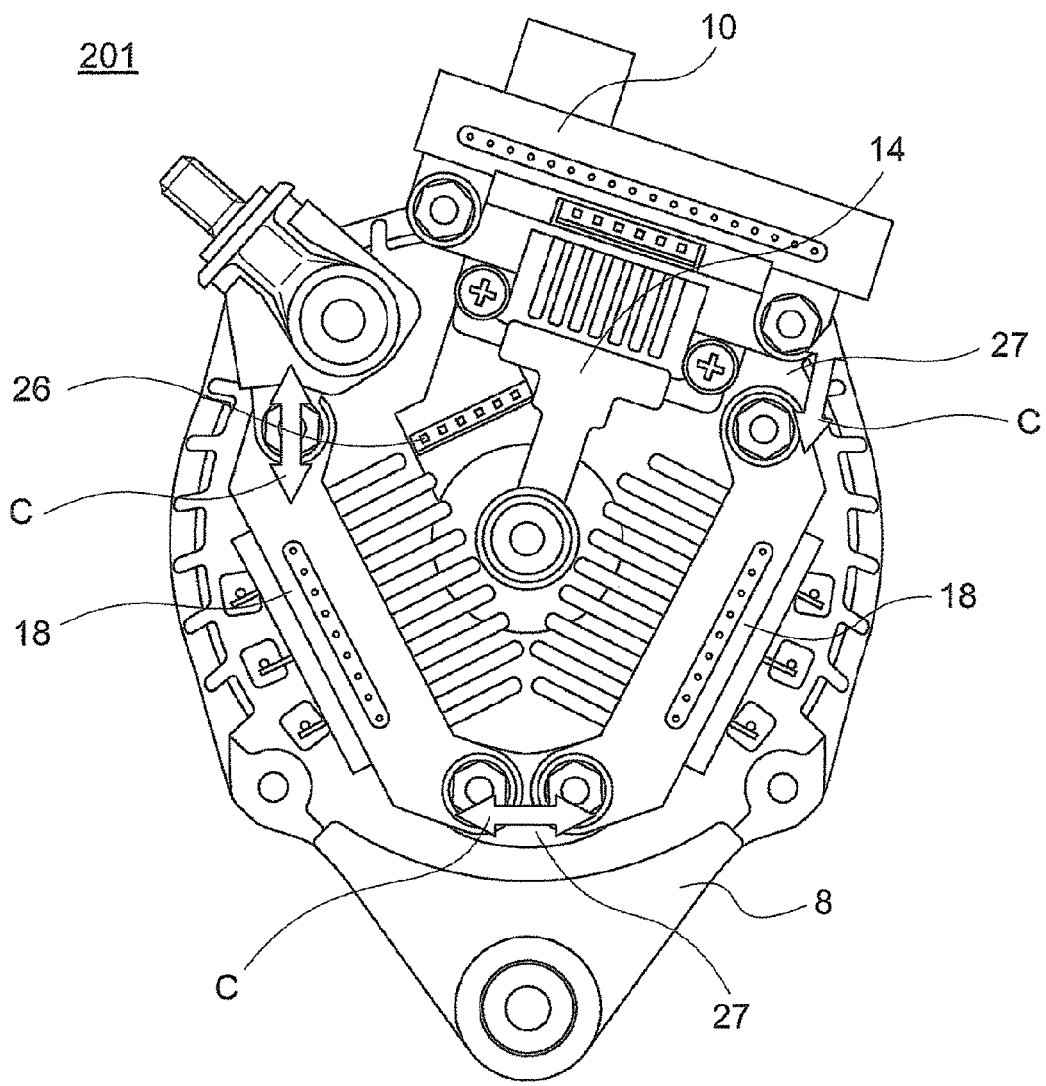
FIG. 5 is a view illustrating an outer side of a rear housing of a rotary electric machine according to a third embodiment of the present invention.

Next, a third embodiment of the present invention is described with reference to FIG. 5. FIG. 5 is a view illustrating an outer side of a rear housing of a rotary electric machine according to the third embodiment of the present invention. In a rotary electric machine 201 of the third embodiment, in a power source path for giving or receiving power with respect to outside, substantially one line is used as power wiring in the rotary electric machine 201, that is, a current path between assemblies is set to be substantially one line as indicated by a reference symbol C. This connects power assemblies to each other and connects the power assemblies to a control assembly, respectively, through one current path, and hence, an imbalance of a voltage applied across the power assemblies can be prevented, and the damages to the power assemblies caused by the imbalance can be prevented. Note that, in the third embodiment, the configuration other than the configuration described above is the same as that of the first embodiment or the second embodiment described above.

Hereinabove, the contents of the present invention are described specifically by way of preferred embodiments. However, it is apparent that those skilled in the art can take various modified embodiments based on the basic technical idea and teaching of the present invention.

What is claimed is:
1. A rotary electric machine, comprising:
a front housing and a rear housing;
a stator including an armature winding and integrally fixed to the front housing and the rear housing;
a rotor including a shaft configured as a rotation shaft and a field winding and placed so as to be opposed to the stator;
a front bearing and a rear bearing integrally fixed to the front housing and the rear housing, configured to rotatably hold the rotor;
a slip ring integrally fixed to the shaft, configured to supply a field current to the field winding;
a power assembly including a heat sink and a switching element configured to carry a current to the stator;
a control assembly including a control circuit configured to control the switching element;
a rotation sensor including a sensor rotor integrally fixed to the shaft and a rotation detecting part integrally fixed to the rear housing, the rotation sensor is disposed on a rear side of the rear bearing; and
a brush holder holding a brush configured to supply a current to the slip ring, wherein:
a surface of the power assembly, on which the switching element is mounted, and a surface of the control assembly, on which a control element of the control circuit is mounted, are placed in parallel to the rotation shaft; and
the rotation sensor is placed between the rear bearing and the slip ring.
2. A rotary electric machine according to claim 1, wherein the control assembly comprises:
a control circuit module comprising modularized portions of the control circuit; and
a field module comprising modularized portions of a field circuit configured to supply power to the field winding.
3. A rotary electric machine according to claim 1, wherein:
the control assembly comprises the control circuit and a field circuit configured to supply power to the field winding, the control circuit and the field circuit being housed in a common case to be packaged as one module; and
the rotary electric machine further comprises heat sinks on the control circuit side and the field circuit side, respectively.
4. A rotary electric machine according to claim 1, wherein the rotation sensor and a part of the control assembly are aligned in a direction orthogonal to the rotation shaft.
5. A rotary electric machine according to claim 1, wherein:
a plurality of power assemblies are provided as said power assembly; and
circumferential end surfaces of the plurality of power assemblies and a circumferential end surface of the control assembly are proximate to one another.
6. A rotary electric machine according to claim 5, wherein the plurality of power assemblies are connected to each other, and the plurality of power assemblies are connected to the control assembly, respectively, through one current path.
7. A rotary electric machine according to claim 1, wherein:
the rotation sensor is covered with a rotation sensor protecting cover from a rear side thereof; and
the brush holder is connected to a rear side of the rotation sensor protecting cover.
8. A rotary electric machine according to claim 1, wherein the slip ring is disposed rearward of the rotation sensor.

* * * * *